United States Patent [19]
Morrill

[11] 4,371,802
[45] Feb. 1, 1983

[54] HALF-PITCH CAPACITOR INDUCTION MOTOR

[76] Inventor: Wayne J. Morrill, 3448 S. Washington Rd., Fort Wayne, Ind. 46804

[21] Appl. No.: 271,667

[22] Filed: Jun. 8, 1981

Related U.S. Application Data

[63] Continuation-in-part of Ser. No. 155,104, Jun. 12, 1980, abandoned, which is a continuation of Ser. No. 934,902, Aug. 18, 1978, abandoned.

[51] Int. Cl.$^3$ .............................................. H02K 17/00
[52] U.S. Cl. ................................... 310/166; 310/211; 310/212; 318/794; 318/816; 318/817
[58] Field of Search ............... 310/166, 198, 184, 203, 310/207, 208, 211, 212; 318/794, 817, 816

[56] References Cited
U.S. PATENT DOCUMENTS

| | | | |
|---|---|---|---|
| 471,155 | 3/1892 | Thomson | 318/817 |
| 2,907,904 | 10/1959 | Carpenter | 310/166 |
| 3,555,382 | 1/1972 | Miyasaka et al. | 318/817 |

*Primary Examiner*—Donovan F. Duggan
*Attorney, Agent, or Firm*—Gust, Irish, Jeffers & Hoffman

[57] ABSTRACT

A balanced, half-pitch capacitor induction motor having a stator core member with equally spaced teeth equal in number to twice the number of motor poles and with the inner ends of the teeth having equal angular extent, and a squirrel cage rotor member. The main field winding comprises serially connected coils equal in number to the number of motor poles respectively embracing alternate, consecutive ones of the teeth and being adapted to be connected across a single phase source of alternating current. An auxiliary field winding comprises serially connected coils embracing consecutive teeth intermediate the teeth having the main winding coils thereon, the auxiliary winding coils being serially connected with a phase-displacing capacitor across the serially connected main winding coils. The main and auxiliary windings have equal ampere turns and equal pitch thereby providing a balanced, half-pitch, two phase motor winding. The rotor member has its squirrel cage bars spiraled by one-tenth of a full turn, i.e., two pole pitches of the 5th harmonic or 36° to eliminate the fifth harmonic in the speed torque curve.

12 Claims, 5 Drawing Figures

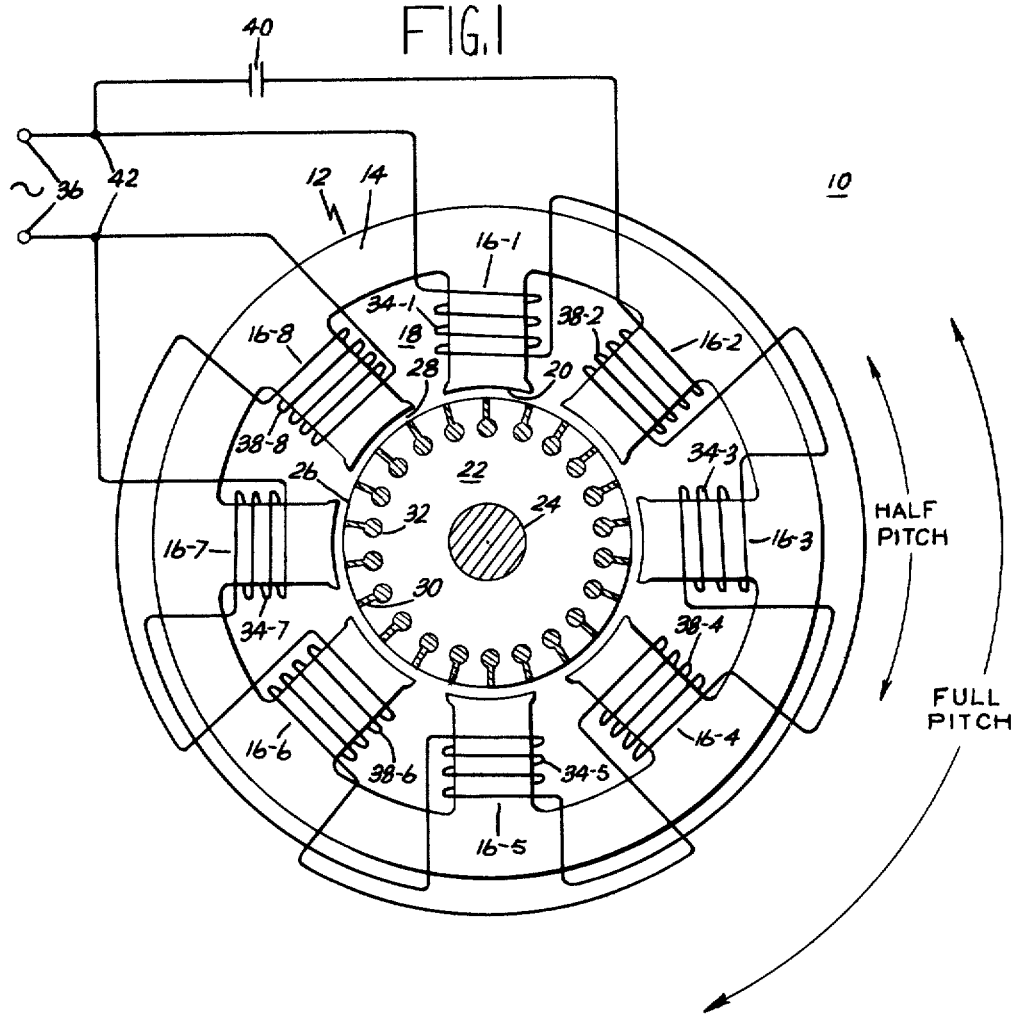
FIG.1
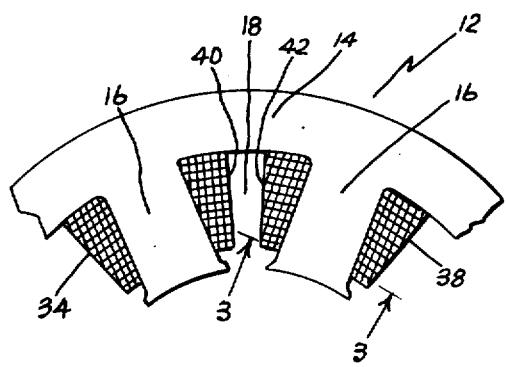
FIG.2
FIG.3

HALF-PITCH CAPACITOR INDUCTION MOTOR

BACKGROUND OF THE INVENTION

This application is a continuation-in-part of application Ser. No. 155,104, filed June 12, 1980, which was a continuation of application Ser. No. 934,902, filed Aug. 18, 1978, both abandoned.

FIELD OF THE INVENTION

This invention relates generally to single phase, permanent-split capacitor induction motors, and more particularly to a half-pitch capacitor induction motor.

DESCRIPTION OF THE PRIOR ART

Inexpensive shaded pole motors have been predominant in the field of very small induction motors, particularly for air moving applications; however, shaded pole motors have a lagging power factor and relatively high power consumption, i.e., are relatively inefficient. There is therefor a need for a very small, inexpensive induction motor having a higher power factor and much lower power consumption, i.e., higher efficiency than the shaded pole motor.

The permanent-split capacitor induction motor provides high power factor operation and is more efficient than a shaded pole motor. The permanent-split capacitor induction motor is an unbalanced two phase motor and in my article entitled "The Revolving Field Theory of the Capacitor Motor," *AIEE Transactions*, Volume 48, April, 1929, pages 614–632, I present the theory of the split-phase motor and general equations for the unbalanced two-phase motor, as applied to the capacitor motor. Conventional capacitor induction motors in the larger frame sizes commonly employ distributed field windings with each main and auxiliary field winding pole comprising a plurality of concentric coils, such successively larger coil embracing a greater number of stator core member teeth and with the span of the largest coil approaching full pitch, i.e., the angular extent of one pole, ninety (90) mechanical degrees in the case of a four pole motor. With this distributed winding arrangement, the coils of each auxiliary field winding pole necessarily overlap the coils of adjacent main field winding poles and the larger span coils of adjacent main and auxiliary field winding poles occupy the same stator core slots. This distributed field winding arrangement approaching full pitch reduces the problem of space harmonics in the air gap flux which produce troublesome dips in the speed-torque characteristic of the motor; an unbalanced two phase motor has torque dips corresponding to all the odd space harmonics of the windings. The phenomenon of harmonics in the air-gap flux is well known and is discussed, for example, in the text entitled "Alternating-Current Machines" by A. F. Puchstein and T. C. Lloyd, John Wiley & Sons, Inc., 1936, pages 248–252.

It is desirable to provide a very small induction motor which will provide maximum unattended life, very quiet operation, low as possible manufacturing cost, minimal probability of accidental electrical failure and, equally importantly, the least possible power consumption, i.e. highest possible efficiency. The permanent split capacitor motor potentially meets all of these objectives; however, the distributed winding used in capacitor induction motors in the larger frame sizes does not lend itself to use in motors in the sub-fractional horsepower sizes. It is essential for low manufacturing cost that the field windings of a motor be capable of being wound automatically and very compactly. Further, in the particular case of very small motors, it is desirable that the as-wound coils be snug and free from stray wires, require neither forming nor lacing of the end turns after winding, and that there be minimal or no contact between the windings of the two phases either in the slots or in the end turns.

The laws of similitude, which govern how the proportions of each feature of any device vary as its size varies, dictate that as the size "L" of any significant dimensions of the device varies, the relative proportions of the components of the device must vary if the best design of the device is to persist for all sizes. In a small motor, the laws of similitude dictate that as a motor becomes smaller, the number of turns in the winding increase approximately as $(1/L)^2$. In a proportionately dimensioned motor, the area of a winding slot is proportional to $L^2$ and thus, the cross-sectional area of a single winding wire must vary substantially as $L^4$. It is thus seen that winding the stator not only becomes more time consuming as "L" becomes smaller but also, the very small wire becomes more difficult to handle. With the wire area decreasing as $L^4$ and the number of turns increasing as $(1/L)^2$, the resistance of the winding increases as $(1/L)^6$ and it becomes important to provide a very short mean length turn on each winding coil. Further, as a motor is made smaller, leakage reactance, which is the prime limitation on output in large induction motors, becomes less important, and magnetizing current, which is of little importance in large induction motors, becomes very important.

The foregoing discussion suggests a balanced capacitor induction motor having the windings of its two phases both wound half-pitch with each coil embracing one only stator tooth of a two tooth per pole stator, the motor also having a very small airgap.

I have used a half-pitch winding for a "teaser" induction motor, and for a two-pole synchronous capacitor hysteresis motor used for a phonograph turntable drive. The teaser motor was a balanced two-phase induction motor which obtained its quadrature voltage from the auxiliary winding of another motor, and was used to operate a cooling fan in conjunction with a hermetic refrigeration machine. I used the starting winding of the relatively large compressor motor to provide a quadrature voltage so that the time phase of the excitation of the teaser motor was truly two-phase. Then by unbalancing the quadrature phase of the teaser motor by exactly the same amount as the compressor motor starting and main windings were unbalanced in turns, I supplied the teaser motor with balanced two-phase excitation and it operated as a balanced two-phase motor. However, it was necessary to match the teaser motor to a particular compressor motor design and if a different compressor motor design was used having a different ratio of starting winding turns to main winding turns, unbalanced excitation of the teaser motor was provided resulting in undesirable circulating current in the teaser motor windings; that circulating current caused the motor to be very inefficient and possibly burn up.

The half-pitch, two-pole synchronous capacitor hysteresis motor employed a non-slotted chrome magnet steel rotor and I found that it had sufficient synchronous power to drive a phonograph turntable, the stator winding space harmonics apparently being insufficient to saturate the rotor and produce appreciable objectionable negative hysteresis torques at full speed. In my design of that 1/1000 HP hysteresis motor, I saturated the yoke of the rotor, which had no winding, and the third harmonic flux, having only one-ninth as much flux per pole as the fundamental flux, was unable to produce enough flux ripple to generate appreciable hysteresis harmonic torques and consequently, the rotor ran without torque dips.

My U.S. Pat. No. 4,045,698 discloses the advantage of the use of very small airgaps in very small induction motors.

To the best of my knowledge and belief, a half-pitch winding has never been used for a permanent-split capacitor induction motor, it being my belief and perhaps the belief of other motor engineers that the space harmonics in the air gap produced in a balanced, half-pitch two-phase motor would produce harmonic torque dips in the speed torque characteristic of insurmountable proportions and negative torque drags at operating speeds which would detract from motor output and reduce operating efficiency.

A full pitch or half-pitch winding produces an essentially rectangular flux wave shape in the air gap. It is well-known that a rectangular wave having identical, repetitive, positive and negative lobes, when examined for its harmonic content, contains all possible odd harmonics with the amplitude of each harmonic being proportional to the reciprocal of the order of the harmonic. In the case of a two-phase full or half-pitch induction motor, each of the main and auxiliary windings produces flux waves having the whole range of harmonics, all of which adversely affect motor performance, some more than others. I have found that in the case of a balanced two-phase motor in which the windings of the two phases have identical ampere turns and full or half-pitch distribution, and in which the current in the two phases is 90° time displaced, the actual flux harmonics of the two phases are identical but the combination of the two phases results in rotation of the successive odd harmonic flux waves in opposite directions. This means that if the direction of rotation of the fundamental flux wave is taken as positive, i.e., in the forward direction, the third harmonic flux wave rotates in the negative or backward direction, the fifth harmonic rotates in a forward direction, the seventh in a backward direction, et seq.

I have found by experiment the pleasantly surprising result that the seventh and higher harmonics in subfractional horsepower, balanced half-pitch, permanent-split capacitor motors with no interlacing windings do not seem to link effectively with a squirrel cage winding having as few as five and one-half rotor bars per pole because no torque dips due to those space harmonics are discernible in the speed-torque curve. In a four-pole motor, the fifth space harmonic does produce a noticeable torque dip at about 600 rpm in the forward direction and the third harmonic produces a very pronounced dip at about 400 rpm in the backward direction (see FIG. 4). Both of these space harmonics also produce positive lobes of torque, the fifth harmonic lobe being at about 225 rpm and the third harmonic lobe at about 900 rpm; since the third harmonic dip occurs at backward speed, i.e., in the reverse direction of rotation, it represents no hazard in a fan motor which operates only in a forward direction.

I have found that the fifth harmonic torque dip which occurs at a forward speed of about 600 rpm can be eliminated, or substantially reduced, by spiraling the squirrel cage bars through two poles of the fifth harmonic flux, i.e., one-tenth of a full turn or 36° mechanically, and preferably insulating the rotor bars from the laminations. So-spiraling the rotor bars results in substantial elimination of the fifth harmonic of the flux wave because each incremental length of rotor bar has a vector fifth harmonic voltage generated therein, those voltages vectorially adding up to zero in 360° electrical.

It is also possible to eliminate, or substantially reduce, the fifth harmonic of the flux wave by using a twin squirrel cage as shown and described in my U.S. Pat. No. 2,037,532, and as discussed in a text, *A Study of the Induction Motor*, by F. T. Chapman, John Wiley & Sons, Inc., 1930. Use of two squirrel cages each having 20 bars in the case of a four pole motor, or each having 30 bars in the case of a six pole motor, will result in a substantial elimination of the fifth harmonic. The bars preferably are also insulated when using the twin squirrel cage construction.

The balanced, half-pitch winding for a permanent-split capacitor motor with no interlacing between the coils of the two phases eliminates the multiplicity of close contact pressure points between the wires of the two phases encountered with conventional distributed windings, such pressure points being the source of grounds and shorts between the two windings. Further, the half-pitch winding is capable of being wound with a conventional gun-type winding machine, the end turns of the completed coils do not require either lacing or forming, and the sides of adjacent coils are spaced from each other for good air-insulation and ventilation.

SUMMARY OF THE INVENTION

The invention resides in a single-phase, permanent-split capacitor induction motor which includes a stator core member having a plurality of substantially angularly spaced, radially inwardly extending teeth which respectively define winding slots therebetween, the teeth having inner ends which define a bore. A rotor member is provided in the bore having a peripheral surface defining air gaps with the inner ends of the stator teeth and having generally axially extending slots formed therein with a squirrel cage winding in the slots. A main field winding is provided in the stator core member adapted to be connected across a single phase source of alternating current for energization thereby, the main winding forming a predetermined even number of magnetic poles, and an auxiliary field winding is also provided on the stator core member angularly displaced from the main field winding and forming the same number of magnetic poles. A phase-displacement capacitor is coupled with one of the field windings to provide two-phase motor. In accordance with the present invention, in its broader aspects, the teeth of the stator core member have inner ends of equal angular extent and are equal in number to twice the number of the poles, and the main field winding comprises a plurality of coils equal in number to the number of poles respectively embracing alternate consecutive ones of the teeth. The auxiliary field winding comprises a plurality of coils equal in number to the number of poles respectively embracing consecutive teeth intermediate the main winding teeth, there being one coil only on each tooth thereby to provide a half-pitch winding for the motor. The two windings have substantially equal ampere turns and substantially equal pitch thereby providing a balanced winding arrangement.

In accordance with a further aspect of the invention, the rotor member includes means for substantially reducing the effect of the fifth harmonic in the flux wave on the speed-torque characteristic of the motor.

It is accordingly an object of the invention to provide a single phase, balanced half-pitch, permanent split capacitor induction motor.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a schematic illustration of the half-pitch capacitor induction motor of the invention;

FIG. 2 is a fragmentary view showing fully wound field coils on adjacent stator teeth;

FIG. 3 is a cross-sectional view taken along the line 3—3 of FIG. 2;

DESCRIPTION OF THE PREFERRED EMBODIMENT

Figure 4:
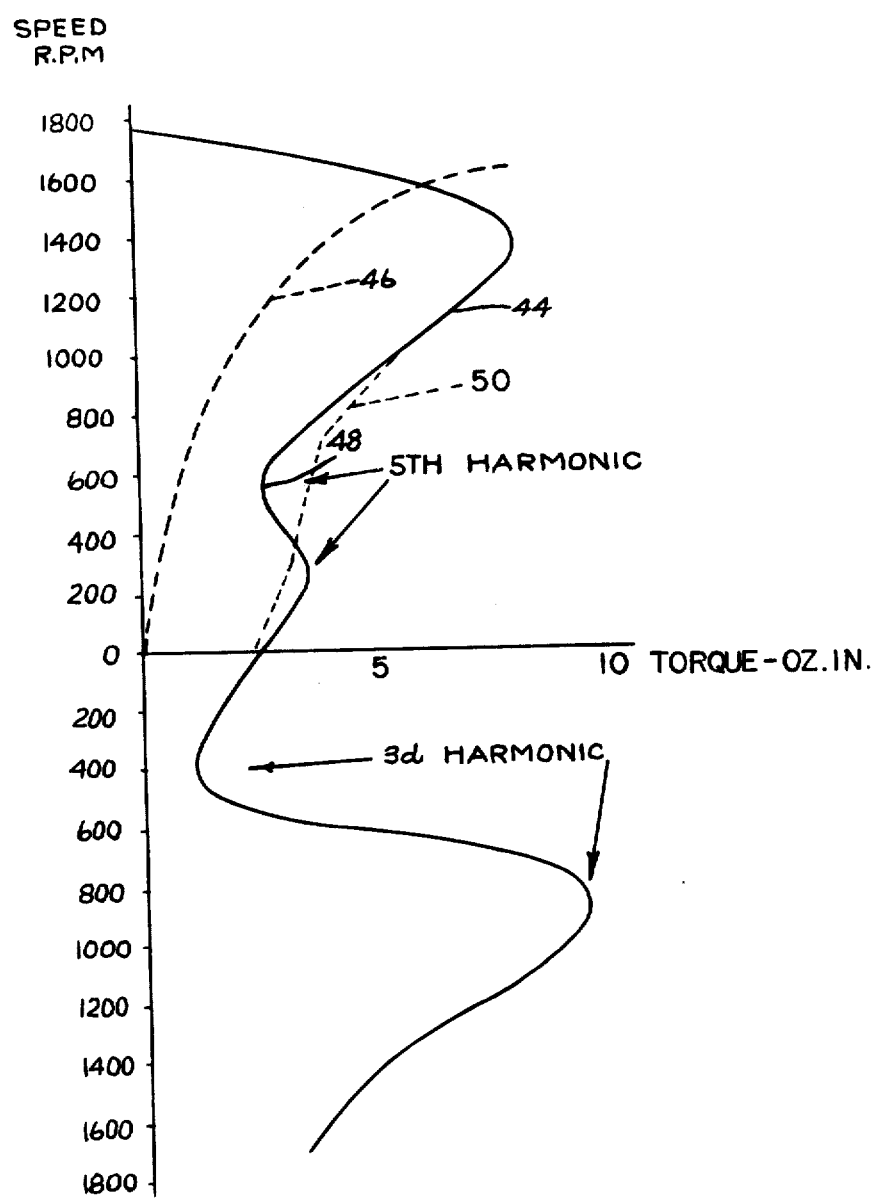
FIG. 4 is a typical speed-torque curve of a motor incorporating the invention.

Referring now to the figures of the drawings, the balanced, half-pitch, permanent split capacitor induction motor of the invention, generally indicated at 10, comprises a laminated stator core member 12 having yoke portion 14 and equally-angularly spaced, radially inwardly extending teeth 16 respectively defining winding slots 18 therebetween. Teeth 16 have inner ends 20 which define a bore for receiving laminated rotor member 22 on shaft 24. Outer periphery 26 of rotor member 22 defines radial air gaps 28 with inner ends 20 of stator teeth 16 and has generally axially extending slots 30 formed therein for squirrel cage winding 32. The number of stator teeth 16 is twice the number of poles of motor 10 and thus, in the illustrated embodiment in which motor 10 has four poles, there are eight stator teeth 16. As shown in FIGS. 1 and 2, inner ends 20 of teeth 16 have equal angular extent, i.e., the pole face 20 of each tooth 16 embraces outer periphery 26 of rotor member 22 with the same span as every other tooth.

A main field winding is provided comprising serially connected coils 34 embracing consecutive alternate teeth 16, coils 34-1, 34-3, 34-5 and 34-7 respectively embracing teeth 16-1, 16-3, 16-5 and 16-7 in the illustrated embodiment, i.e., there are the same number of coils 34 as the number of poles. Main field winding coils 34-1, 34-3, 34-5 and 34-7 are serially connected across single phase alternating current source 36, such as 120 volts, 60 Hertz.

An auxiliary field winding is provided comprising coils 38 respectively embracing consecutive alternate teeth 16 intermediate the teeth upon which main winding coils 34 are wound, coil 38-2 on tooth 16-2, 38-4 on tooth 16-4, 38-6 on tooth 16-6 and 38-8 on tooth 16-8 in the illustrated embodiment. Auxiliary field winding coils 38-2, 384-4, 38-6 and 38-8 are serially connected with phase shifting capacitor 40 acress the serially connected main field winding coils 34, as at 42. In accordance with the invention, main field winding 34 and auxiliary field winding 38 having substantially equal ampere turns and substantially equal pitch.

As indicated in FIG. 1, full-pitch is the angular extent of one pole of motor 10, i.e., 90° mechanical in the illustrated four-pole embodiment and half-pitch is the angular extent of one-half of one pole, i.e., 45° mechanical in the illustrated four-pole embodiment. It will be seen that the magnetic flux crossing air gap 28 into or out of a respective tooth end 20 has a substantially half-pitch span.

It will be seen that main winding coils 34 and auxiliary winding coils 38 can conveniently be wound directly on the respective stator teeth 16 with a conventional in-slot, gun-type winder. One way to accomplish the winding of coils 34, 38 directly on the respective teeth 16 is with a winder having eight guns which simultaneously wind all of the coils 34, 38. This, however, requires an intercoil connection between each coil of each winding. Alternatively, a single gun winding machine may be employed with the stator indexed by two teeth after winding each coil. In this way, main winding coils 34 can be wound consecutively without cutting the wire extending between each coil following which auxiliary coils 38 can be wound consecutively again without cutting the wire connecting each coil. In this case, the inter-coil connections between main winding coils 34 can be disposed on one side of stator core member 12 and the inter-coil connections between auxiliary coils 38 disposed on the other side, thus leaving only the starting and finishing end of each phase.

Referring specifically to FIGS. 2 and 3, in which gun-wound coils 34, 38 are shown on adjacent stator teeth 16, it will be seen that the mean length of winding turn in each coil is the shortest possible and that sides 40, 42 of adjacent coils 34, 38 which occupy a common slot 18 are spaced from each other for good air-insulation and ventilation.

A balanced, half-pitch, four pole capacitor motor in accordance with the invention delivered 2.1 watts output with 5.1 watts input for an efficiency of more than 41%.

While coils 34 of the main field winding and coils 38 of the auxiliary field winding have been shown as being series connected, it will be understood that the coils of either or both windings can be connected in parallel, if desired.

Referring now to FIG. 4, there is shown a typical speed-torque curve for the balanced half-pitch capacitor motor of the invention described above shown by the solid line curve 44 but with the rotor bars spiraled insufficiently to eliminate the fifth harmonic speed-torque dip, the speed-torque characteristic of the fan operated by the motor being shown by the dashed line curve 46. With the value of capacitor 40 and the number of turns and wire size of auxiliary winding 38 chosen so that the main and auxiliary windings have nearly balanced volts per turn conditions and are in time quadrature at the rated operating speed of the motor, i.e., about 1,500 rpm in the case of the motor of FIG. 4, the third harmonic dip appears in the backward speed-torque curve, and the torque requirement of the fan at the speed of the fifth harmonic dip, as indicated at 48, is still less than the motor torque available, thus permitting the motor to accelerate to rated speed without hanging-up at the speed of the fifth harmonic. The speed-torque curve shown in FIG. 4 is taken from an actual test curve and it will be seen that no backward seventh and forward ninth harmonics appear.

Figure 5:
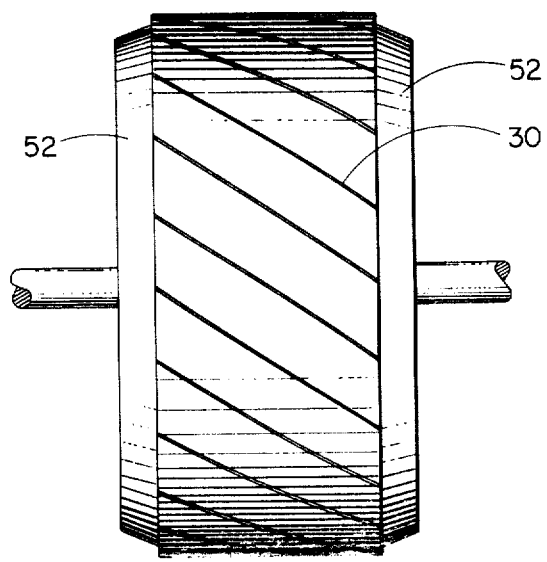
FIG. 5 is a side view of a squirrel cage rotor member having approximately a 36° spiral for eliminating the fifth harmonic of the flux wave.

Referring to FIG. 5, as explained above, slots 30 of squirrel cage rotor member 22 in which bars 32 are positioned, preferably by die casting, may be spiraled through two poles of the fifth harmonic flux, i.e., one-tenth of a full turn or 36° mechanically in order to eliminate the effect of the fifth harmonic flux wave on the speed-torque curve. Squirrel cage bars 32 are connected by conventional end rings 52. Spiralling a squirrel cage rotor 1.777" in diameter by an amount substantially equal to two pole pitches of the fifth harmonic amounts to a peripheral distance of $\pi(1.777/4)\times(2/5)=0.558"$. Substantial reduction in the dip in the speed-torque characteristic may be accomplished with spiralling slightly less than two pole pitches for the fifth harmonic; a spiral of 33° will leave about 10% of the fifth harmonic voltage. The 22 slot rotor shown in FIG. 5 has a two-slot pitch spiral of 32.727° mechanical. As further discussed above, spiraled squirrel cage bars are preferably insulated from the rotor laminations by any technique known to those skilled in the art, especially where the bars are spiraled less than through two pole pitches for the fifth harmonic. The speed-torque characteristic resulting from the use of the spiralled, insulated squirrel cage shown in FIG. 5 is shown in dashed lines at 50 in FIG. 4.

The series connected main field winding coils 34-1, 34-3, 34-5 and 34-7 may also be connected in series with the series-connected auxiliary field winding coils 38-2, 38-4, 38-6 and 38-8, with capacitor 40 connected in parallel across either winding.

It will now be seen that I have provided a balanced, half-pitch capacitor induction motor which provides high power factor and highly efficient operation and which employs gun-wound coils with minimum mean length of turns, short end turns which do not require forming or lacing, and no interlacing between the coils of the two phases.

While there have been described above the principles of this invention in connection with specific apparatus, it is to be clearly understood that this description is made only by way of example and not as a limitation to the scope of the invention.

What is claimed is:

1. In a single phase, permanent split capacitor induction motor including a stator core member having a plurality of substantially equally angularly spaced, radially inwardly extending teeth respectively defining winding slots therebetween, said teeth having inner ends defining a bore, a rotor member in said bore having a peripheral surface defining air gaps with said inner end of said teeth and having generally axially extending slots formed therein, a squirrel cage winding in said rotor member slots extending between the ends of said rotor member, a main field winding on said stator core member, said main winding forming a predetermined even number of magnetic poles, an auxiliary field winding on said stator core member mechanically angularly displaced from said main field winding and forming the same number of magnetic poles, means for coupling said windings for energization by a single phase source of alternating current, and a phase-displacing capacitor coupled in circuit with one of said field windings thereby providing a two-phase motor: the improvement wherein said inner ends of said teeth have equal angular extent and said teeth are equal in number to twice the number of said poles, said main field winding comprising a plurality of coils equal in number to the number of said poles, said main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said first-named alternate teeth, there being one coil only on each said tooth thereby providing a half-pitch winding for said motor, said main and auxiliary field windings having substantially equal ampere turns and substantially equal pitch thereby providing a balanced two-phase winding.

2. The motor of claim 1 wherein said main field winding coils are connected in series, said auxiliary field winding coils being connected in series and in series with said capacitor, said auxiliary field winding and series capacitor being connected in parallel across said main field winding.

3. The motor of claim 2 wherein each adjacent pair of coils have sides occupying a common slot, the sides of adjacent coils being spaced-apart.

4. The motor of claim 3 wherein the value of said capacitor and the number of turns and wire size of said auxiliary field winding is such that said main and auxiliary field windings approach a balanced volts per turn condition and are in time quadrature at the normal operating speed of said motor.

5. The motor of claim 4 wherein said motor is in a sub-fractional horsepower size.

6. The motor of claim 1 wherein said main field winding coils are connected in series, said auxiliary field winding coils being connected in series, said main and auxiliary field windings being connected in series, said capacitor being connected in parallel across one of said windings.

7. The motor of claim 1 wherein said rotor member includes means for substantially reducing the effect of the fifth harmonic in the flux wave on the speed-torque characteristic of the motor.

8. The motor of claim 7 wherein said last-named means comprises spiralling said rotor member slots and squirrel cage winding bars through substantially two-pole pitches of the fifth harmonic.

9. The rotor of claim 8 wherein said rotor member is laminated, said last-named means further comprising means for insulating said bars from said rotor member laminations.

10. The motor of claim 7 wherein said rotor member is laminated, said last-named means comprising said rotor member slots and squirrel cage winding bars being spiralled from one end of said rotor member to the other, and means for insulating said bars from said rotor member laminations.

11. The rotor member of claim 7 wherein said last-named means comprises a twin squirrel cage winding.

12. The rotor member of claim 11 wherein said last-named means further comprises means for insulating the bars of said squirrel cage winding from said laminations.

* * * * *